United States Patent [19]

Bielefeldt

[11] 4,244,708
[45] Jan. 13, 1981

[54] METHOD AND APPARATUS FOR SEPARATING COMPONENTS FROM A FLOWING MEDIUM BY MEANS OF CENTRIFUGAL FORCE

[75] Inventor: Ernst-August Bielefeldt, Hollenstedt, Fed. Rep. of Germany

[73] Assignee: Messerschmitt-Boelkow-Blohm Gesellschaft mit beschrankter Haftung, Munich, Fed. Rep. of Germany

[21] Appl. No.: 30,097

[22] Filed: Apr. 16, 1979

Related U.S. Application Data

[63] Continuation of Ser. No. 772,491, Feb. 28, 1977, abandoned.

[30] Foreign Application Priority Data

Mar. 10, 1976 [DE] Fed. Rep. of Germany ....... 2610031

[51] Int. Cl.³ ............................................ B01D 45/12
[52] U.S. Cl. ......................................... 55/1; 55/343; 55/345; 55/416; 55/454; 55/460; 55/459 R; 209/144
[58] Field of Search ................. 55/459 R, 454, 460, 55/459 B, 345, 416, 349.1, 343; 209/144; 210/512

[56] References Cited

U.S. PATENT DOCUMENTS

| 394,240 | 12/1888 | Allington et al. ..................... 209/144 |
| 418,834 | 1/1890 | Allington et al. ..................... 209/144 |
| 2,236,548 | 4/1941 | Proaty ................................. 55/459 R |

FOREIGN PATENT DOCUMENTS

| 202987 | 4/1959 | Austria . |
| 2224458 | 9/1973 | Fed. Rep. of Germany ........ 55/459 R |
| 899903 | 9/1944 | France ................................. 55/459 B |
| 713670 | 8/1954 | United Kingdom ..................... 55/416 |
| 1018743 | 2/1966 | United Kingdom ..................... 209/144 |

*Primary Examiner*—Bernard Nozick
*Attorney, Agent, or Firm*—W. G. Fasse; W. W. Roberts

[57] ABSTRACT

A method and apparatus are disclosed for separating components from a flowing medium by means of centrifugal force. The flowing medium travels through two stages. In the first stage a spin is generated and in the second stage the actual material separation is accomplished in one or several separating devices by means of one or several whirling or eddy sources. The apparatus includes a spin generator housing and separator chambers, whereby spin conduits extend into the separator chambers toward exhaust pipes to such an extent that a spacing is provided between the spin conduit and the exhaust pipe. At least one exhaust suction is tangentially effective in the area of this spacing.

14 Claims, 13 Drawing Figures

Fig.13

METHOD AND APPARATUS FOR SEPARATING COMPONENTS FROM A FLOWING MEDIUM BY MEANS OF CENTRIFUGAL FORCE

This is a continuation of application Ser. No. 772,491 filed Feb. 28, 1977 now abandoned.

CROSS REFERENCE TO RELATED APPLICATIONS

The present invention is related to my previous invention as disclosed in Ser. No. 717,148, filed Aug. 24, 1976 now abandoned, and entitled "APPARATUS AND METHOD FOR SEPARATING A SPECIFIC LIGHTER COMPONENT FROM A FLOWING MEDIUM".

BACKGROUND OF THE INVENTION

The invention relates to a method and apparatus for separating components from a flowing medium by means of centrifugal forces which are effective on the flowing medium.

The separation of material components from a flowing medium by means of centrifugal forces is well known and many solutions to this type of separation are available in the art. Especially German Patent Publication (DOS) No. 2,160,415, discloses a method for separating and precipitating or removing of material components suspended in a medium, said separating or removing being accomplished by means of centrifugal force. In the known method the medium to be cleaned or worked is guided into a bent main flow. A stationary eddy is produced on the concave side at a flow off edge of the main flow. The stationary eddy flows along the entire width of the flowing medium, whereby a portion of the circumferentially outer area of the eddy flow contacts the main flow or overlaps the main flow. In this manner it is possible to generate an orderly flow field subject to a high centrifugal force effect which, in addition, is self-stabilizing and clean in an aerodynamic sense. The proportion to be separated or removed from the flowing medium is collected in the center of the eddy chamber and removed from the eddy zone through axially extending exit conduits.

The separated particles leave the eddy zone under the influence of the centrifugal force and return into the main stream which carries the particles past the eddy chamber. The separation or removal even of the finest particles is very efficient in the just described prior art method. However, there is room for improvement with regard to the ratio between the separated clean volume flow and the initial total or raw volume flow. In the prior art this ratio is relatively low.

OBJECTS OF THE INVENTION

In view of the foregoing, it is the aim of the invention to achieve the following objects, singly or in combination:

to provide a method for the particle separation by means of centrifugal force, whereby the effect of self stabilizing, aerodynamically clean and orderly flow fields is utilized for a particle separation with a substantially increased ratio between the cleaned volume flow and the initial raw or total volume flow;

to pass the material flow through one or more spin generators prior to the separation proper and to recover the spin energy after the separation;

to separate the more easily separated components already in the spin generator chamber; and to provide an apparatus for the performance of the present method which is simple in structure and economical in its manufacture and use.

SUMMARY OF THE INVENTION

According to the invention, there is provided a method for the separation of components such as particles from a flowing medium by means of centrifugal forces effective on the flowing medium, wherein the medium to be treated is passed through two stages. In the first stage, the medium is subjected to a spin generation in one or more spin generators. In the second stage, the separation is accomplished in one or several separation devices by means of one or several eddy generators or sources.

According to the invention there is further provided an apparatus for performing the present method in a spin generator housing provided with one or several spin conduits which reach into one or several separator chambers in such a manner that a spacing is provided between the ends of the spin conduit and a respective exhaust pipe. Each separator housing is provided with at least one tangentially effective exit port.

According to a further improvement of the invention, the treated flowing medium is passed through an apparatus for recovering the spin energy subsequent to the separation proper. Preferably, the separation housing or chamber is located on a cyclone of conventional construction.

If desired, the spin generator housing may be provided with exit ports for the separation of a proportion of a volume flow which comprises the easily separable particles or an easily separable medium. At least one fan or blower is part of the apparatus for performing the present method.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
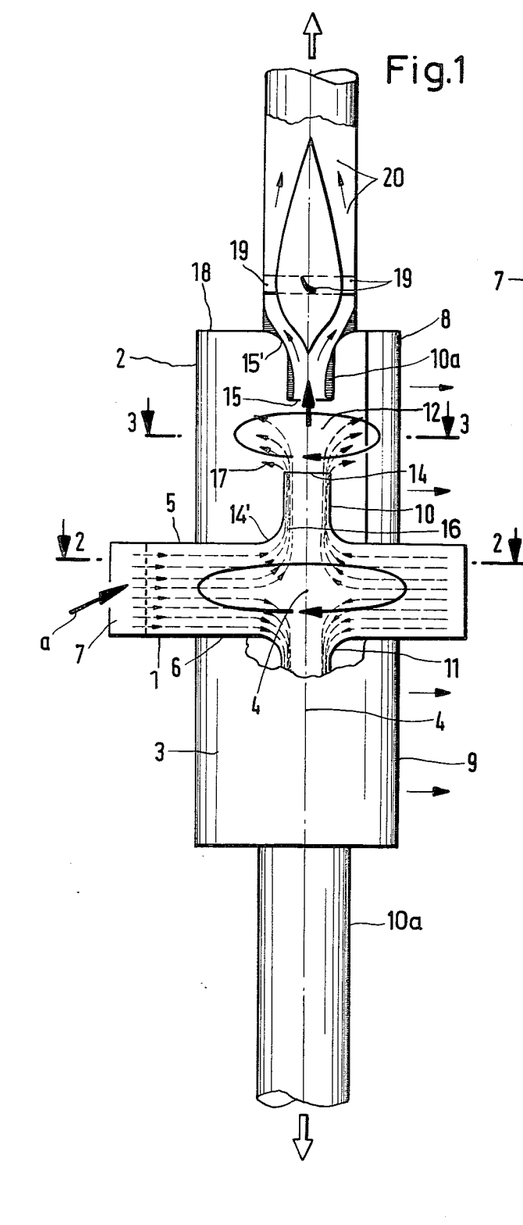
FIG. 1 is a longitudinal axial section through an apparatus, according to the invention, for performing the method according to the invention.
Figure 2:
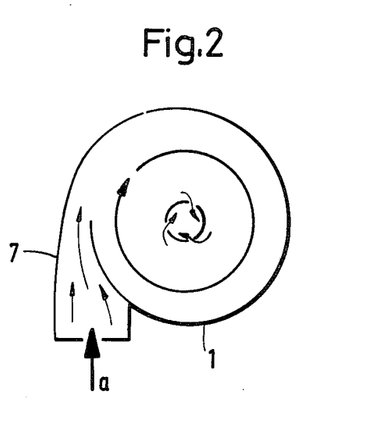
FIG. 2 is a sectional view along section line 2—2 in FIG. 1.
Figure 3:
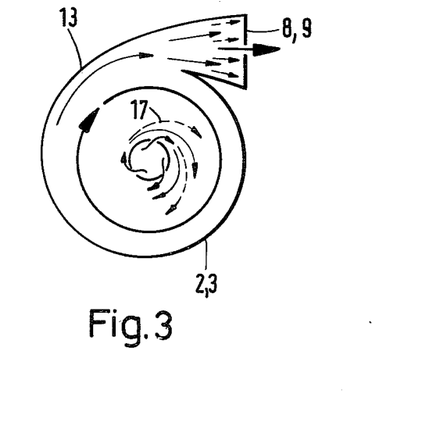
FIG. 3 is a sectional view along section line 3—3 in FIG. 1.

FIGS. 1, 2, and 3 illustrate one example embodiment of an apparatus according to the invention, suitable for performing the method of the invention by means of a spin generator housing 1 provided with spin conduits 10 and 11 extending axially out of the spin generator housing. Two separator chambers 2 and 3 are operatively connected to the spin generator housing 1 so that the spin conduits 10 and 11 reach into the housings 2 and 3, respectively. Exhaust pipes 10a reach axially into the separator chambers 2 and 3 to such an extent that a spacing 12 is provided between the exit ports 14 of the spin conduit 10 and the entrance port 15 of the exhaust pipe 10a. The same arrangement is provided symmetrically in the lower portion of the apparatus. The spin generator housing 1 is provided with an entrance port 7 through which the raw flow represented by the arrow "a" enters into the spin generator. The entrance port 7 is arranged so that the raw, unclean medium flow "a" may enter tangentially into the spin generator housing 1. As shown, for example, in FIG. 2 the spin generator housing 1 may have a spiral shape, whereby in conjunction with the tangential entrance 7, a rotational flow is generated within the space defined by the upper and lower horizontally extending walls 5 and 6 of the spin generator housing 1 which walls 5, 6 merge into the respective spin conduits 10 and 11. The type of spin flow generated results from the superposition of a pure vortex or whirling flow with a sink flow as shown by the radially inwardly directed arrows at the entrance end of said spin conduits 10 and 11 in FIG. 1.

When the medium passes through the spin conduits 10 and 11 the spin of the medium generated in the housing 1 is maintained so that inside the spin conduits 10 and 11, a substantial increase of the rotational speed is accomplished due to the greatly reduced diameter of these conduits 10, 11 relative to the diameter of the housing 1. Due to this increased rotational speed, the heavier components of the medium are accumulated in a very thin layer 16, traveling or guided in spiral paths along the inner surfaces of the spin conduits 10, 11 and from there into the intermediate space 12. The flow in the separation chambers 2 and 3 is determined by the influx of the spinning medium out of the exit port 14 and into the space 12 as well as by the tangentially effective exhaust suction through the channels 8 and 9 as illustrated in FIG. 3. The axially effective suction through the port 15 also influences the flow in the space 12. An eddy source flow is created in the center of the respective separation chambers 2 and 3 under the influence of the just mentioned partial flows. This eddy source flow is superimposed on the spin flow at the exit port 14 resulting in a strong rotational motion as indicated by the respective arrows in the space 12 in FIG. 1.

Spin energy is supplied to the just described superimposed flow fields on the one hand by the rotating spin flow out of the respective port 14 and on the other hand by the predetermined tangential speed along the inner walls of the housing 13 due to the exhaust at the exit ports 8 and 9. After the flowing medium exits from the respective port 14, the heavy components of the medium, for example, heavier dust particles, are shifted into the vicinity of the bent wall of the respective separation housing 2, 3 and are discharged through the exit ports 8 and 9 of the exhaust housing 13 due to the high centrifugal effect of the rotating flow and due to the superimposed tow or entraining effect of the source flow. A secondary flow is induced by the curved flow along the housing wall and this secondary flow is superimposed additionally onto the just described flow. Particles which are entrained by the secondary flow, for example, lighter dust particles, move along the curved housing wall 13 on both sides and in the axial direction until they encounter the chamber walls 5 and 18 of the separation chambers 2 and 3 which guide these lighter particles toward the roots 14', 15' of the respective conduit 10 and exhaust pipe 10a. Here the flow has an axially extending component directed towards the center of the respective chamber and travels on helix type paths which expand in a spiral manner so that these lighter particles also exit from the separation chambers 2, 3 through the exit ports 8 and 9. The just described entraining or tow effect of the secondary flow is directed radially inwardly adjacent to the chamber walls 5 and 18. However, as the shift of the secondary flow increases in the axial direction to the central plane of the separation chambers 2, 3, a gradual reversal of the radially inward flow direction into a radially outward flow direction is accomplished.

Furthermore, the tow or entraining effective of the source flow as well as the centrifugal force are strongest in the area of the central plain of the separation chambers 2 and 3. The superposition of all these effects results in the just mentioned directional shift or change. Thus, the axial shift which begins at the roots 14', 15' of the conduit 10 and the pipe 10a in the respective chambers 2, 3 of the particles entrained by the secondary flow is transformed gradually and more and more into a radially outward flow as the axial flow approaches the radially extending central plane in the chambers 2 and 3. As a result, the entrained particles are again shifted outwardly toward the periphery of the housing and to the exit ports 8, 9. Therefore, the particles which are heavier than the flowing medium travel radially outwardly with a high radial speed component on spirally extending paths 17 after the particles enter into the flow space intermediate the respective ports 14 and 15. Due to this feature, it is possible to axially exhaust the specifically lighter medium at the respective exhaust port 15.

The flow through the port 15 out of the respective separation chambers 2, 3 includes a strong spin component. Therefore, it is efficient to employ a device for the recovery of the spin energy. Such devices are housed in the exhaust pipe 10a downstream of the ports 15 in the form of an "untwister" 19 and a diffuser 20. The geometry of the just described apparatus is not limited to the illustrations of FIGS. 1 to 3, thus, the separation housing may be rather short in its axial extension. By this feature it is possible to greatly amplify the radially outwardly directed entraining effect of the source flow to such an extent that the entraining effect of the secondary flow adjacent to the walls 5 and 18 of the separation chamber is reversed from a radially inwardly directed flow into a radially outwardly directed flow. In this context it would be also possible to let the ports 14 and 15 end substantially in the plane of the respective walls 5 and 18, or at least one of these ports could end substantially in the plane defined by the adjacent wall confining the separation chamber. Thus, the entrance port 14 and/or the exhaust port 15 could end in their respective, adjacent chamber wall 5, 18.

According to a further embodiment of the invention, only one separation chamber could be combined with a spin generator housing, whereby the separation chamber would be attached to one side of the spin generator. The flow volume through the flow intermediate space 12, shown in FIG. 1 would be substantially doubled in such a structure because the spinning flow is not divided, contrary to the arrangement of FIG. 1.

Figure 4:
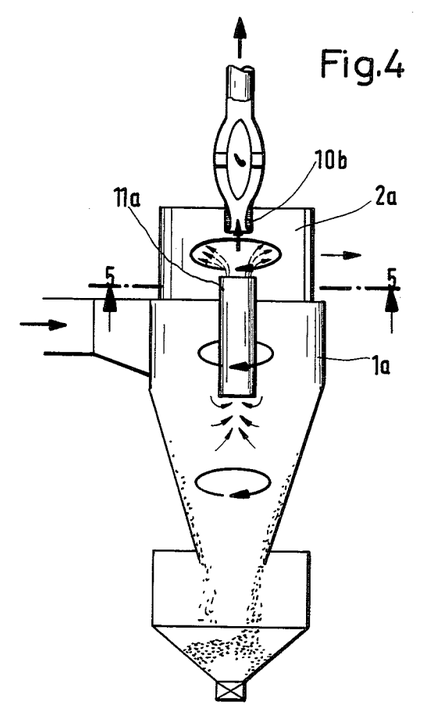
FIG. 4 is a sectional view similar to that of FIG. 1 but showing the apparatus of the invention combined with a conventional cyclone separator.
Figure 5:
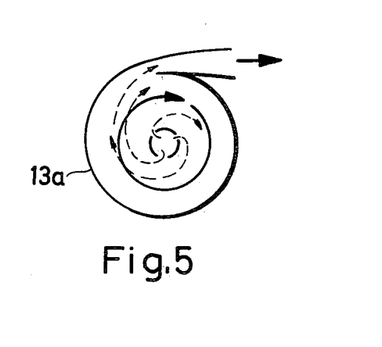
FIG. 5 is a sectional view along section line 5—5 in FIG. 4.

FIGS. 4 and 5 show an example embodiment of an apparatus combining a separation chamber, according to the invention, with a conventional cyclone separator. The cyclone separator housing 1a is used in accordance with the method of the invention, as a spin generator housing, whereby a first separation already takes place in this housing in a known manner. A flow which includes a strong spin or rotational component enters into the immersion spin conduit 11a which reaches downwardly into the housing 1a and upwardly into the separation chamber 2a where a second separation takes place by means of the eddy flow source of the invention. The flow components separated in the separation chamber 2a leave the separation chamber 2a on tangentially extending paths defined by the exhaust member 13a as shown in FIG. 5. The specifically lighter component of the flow medium exit from the separation chamber 2a to the exhaust pipe 10b. Where the just described combination is employed for the dust separation, the cyclone operates as a pre-separator, whereas the serially arranged separation chamber 2a functions as a fine separator.

Figure 6:
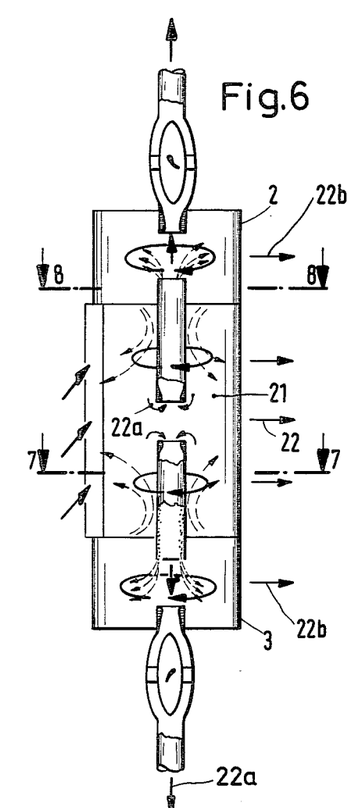
FIG. 6 is a sectional view similar to that of FIG. 1, however, further illustrating the branching-off of a portion of the flow out of the spin generator housing.
Figure 7:
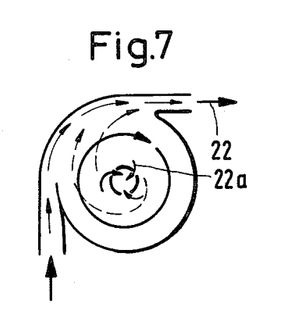
FIG. 7 is a sectional view along section line 6—6 in FIG. 6.
Figure 8:
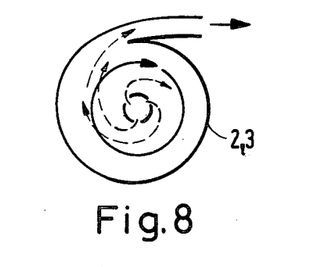
FIG. 8 is a sectional view along section line 8—8 in FIG. 6.
Figure 9:
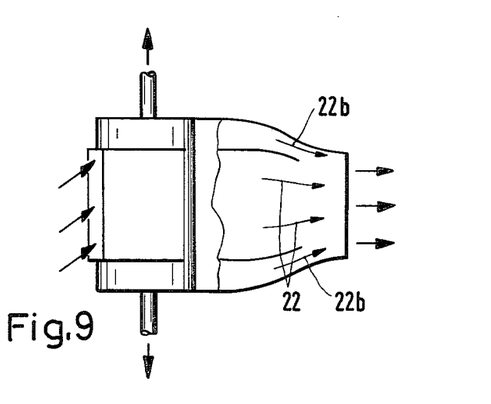
FIG. 9 is a device used in conjunction with the apparatus of FIG. 6 for collecting the remainder raw volume flows.

FIG. 6 illustrates another embodiment of the invention, wherein the spin generator housing 1 of FIG. 1 is replaced by a whirling or eddy chamber 21. Such an eddy chamber is known, for example, from German Patent Publication (DOS) No. 2,160,415 and is used in the present context as a pre-separator or as a so-called coarse separator. As shown in FIG. 7, the volume flow to be treated enters into the eddy chamber 21 in a tangential direction. Inside the chamber 21 the flow is separated into a partial stream 22 exiting in the tangential direction and into the two further partial flows 22a exiting through the two immersion pipes as shown in FIG. 6. Due to the strong eddy flow inside the eddy chamber 21, the partial flows 22a have a strong spin component so that it is possible to subject these partial flows 22a to a separation as taught by the present invention by means of an eddy or spin source flow as described above. Such separation would take place in the separating chambers 2 and 3 as shown in FIG. 8 which also illustrates in dashed lines, the flow paths of the separated particles. FIG. 9 illustrates a structural embodiment for combining the two partial flows 22 and 22b as they emerge from the apparatus according to FIG. 6.

Figures 10, 11, 12:
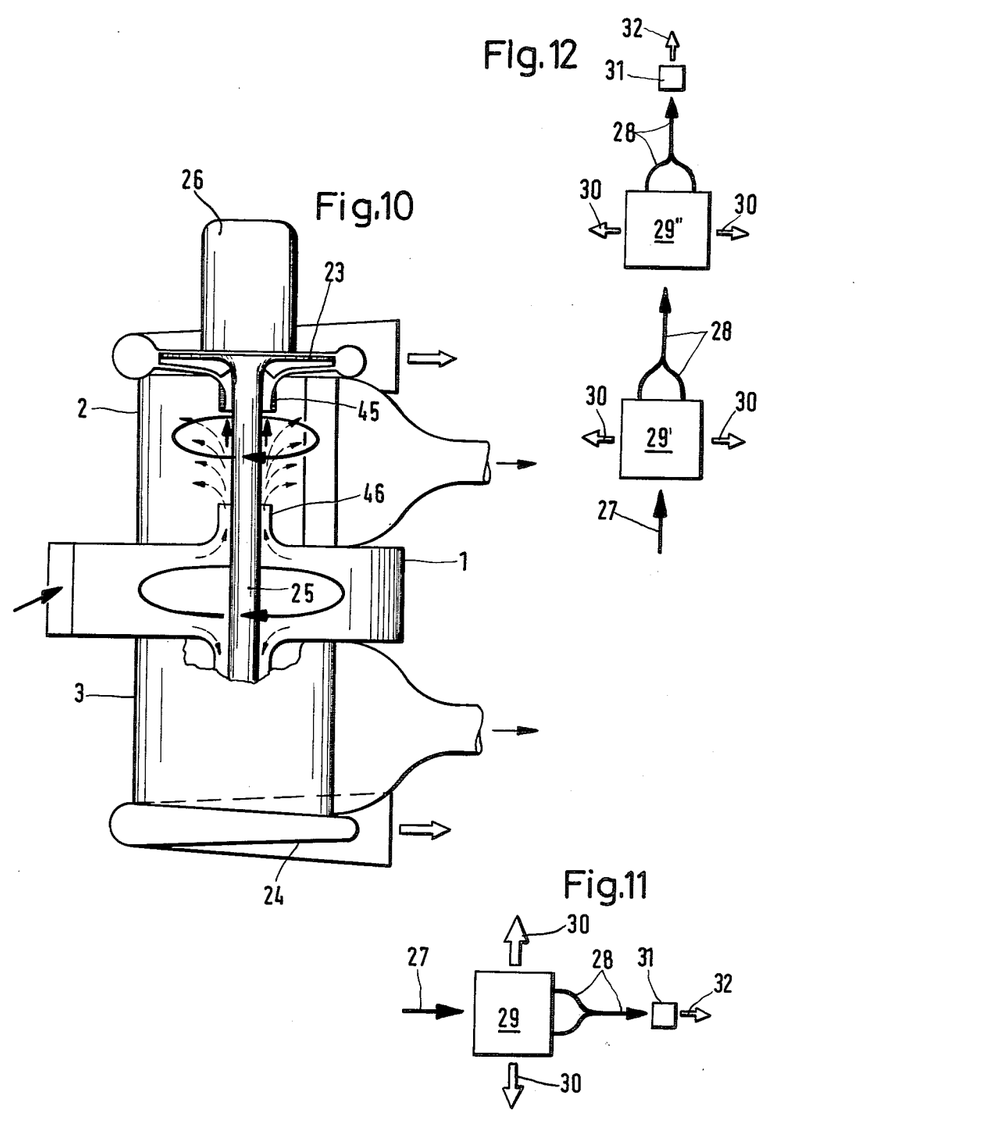
FIG. 10 shows an apparatus according to the invention employing two blowers or super chargers integrated into the apparatus of the invention.
FIG. 11 illustrates a schematic diagram of the arrangement of an apparatus according to the invention in combination with a direct separator.
FIG. 12 illustrates a schematic diagram combining two devices according to the invention with one direct separator.

FIG. 10 illustrates a further embodiment of an apparatus according to the invention comprising the spin generator housing 1 and the two separating chambers 2 and 3 similar to the embodiment of FIG. 1. In the apparatus of FIG. 10 two radially effective blowers 23 and 24 are integrated into the structure for sucking the cleaned medium such as air from which the dust has been removed out of the separating chambers. A common shaft 25 interconnects both blowers 23 and 24 so that both blowers may be driven by a common motor 26. The radial blowers 23, 24 provide the driving power substantially for the total flow except for the source flow in the two separating chambers 2 and 3. Furthermore, it is possible to construct the radial blowers in such a manner that they act as a spin remover. The common shaft 25 which extends coaxially to the main axis of the apparatus and through the spin conduits 45, 46 may be constructed as a rotating cylinder which provides an additional driving force for the total spin flow. Incidentally, in any of the embodiments according to the invention, the driving shaft may be constructed as a rotating driving cylinder for the spin generation.

FIGS. 11 and 12 illustrate, in a schematic manner, examples for the possible interconnections of the devices 29, according to the invention, as illustrated in FIGS. 1 and 10. In FIG. 11 the volume flow 27 of the medium to be cleaned enters into the device 29, or rather into the eddy generator housing thereof. The two partial flows 28 which exit from their respective separating chambers in a tangential manner into the common direct separator 31. The cleaned flow 32 exits from the direct separator 31 as shown, whereas the also cleaned partial flows 30 exit from the apparatus 29, also as shown. In FIG. 12, two cleaning devices 29 are arranged in series, whereby the partial flows 28 of the first cleaning device 29' are fed into the spin generator housing of the second cleaning device 29" which is followed by a direct separator 31 as illustrated.

Figure 13:
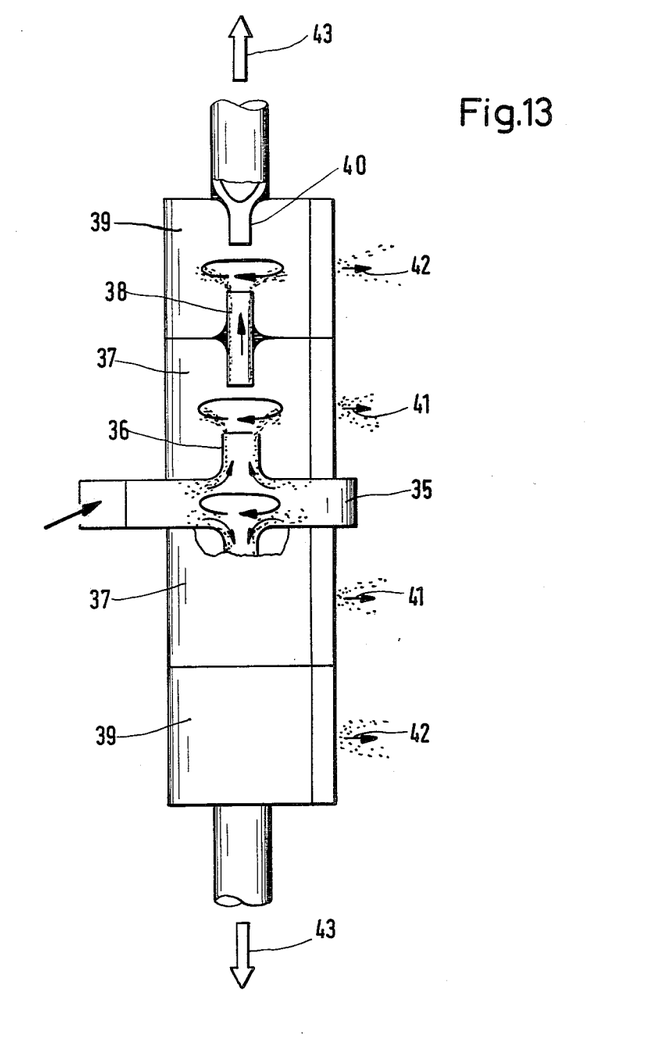
FIG. 13 shows a sectional view similar to that of FIG. 1, but illustrating several separator housings connected in series.

FIG. 13 illustrates another arrangement of an apparatus according to the invention, in which on each side of the spin generator housing 35, two separator chambers 37, 39 are arranged in series. As a result, the material component separation, according to the invention, takes place in three stages. The spin flow travels through the spin conduits 36 into the first separator chamber 37, wherein a separation by means of a whirling or eddy source takes place. The separated particles 41 exit from the separating chamber 37 in a tangential manner as described above. A partial flow travels through the pipes 38 still with sufficient spinning energy. Therefore, it is possible to repeat the separation process in the separation chamber 39, also as described. The separated particles 42 immerge from the separating chamber 39, again in a tangential manner as previously described, and the cleaned medium 43 exits through the exhaust pipes 40.

Incidentally, it is advantageous, where radial blower means are combined with the present apparatus, to place these radial blower means in such position that the exhaust pipes 10a, 10b, 40, 45 of the separation chambers 2, 3, 2a, 37, 39 merge into the intake port of the blowers 23, 24.

Although the invention has been described with reference to specific example embodiments, it will be appreciated, that it is intended to cover all modifications and equivalents within the scope of the appended claims.

What is claimed is:

1. A method for separating heavier particles from a flowing lighter medium by subjecting the flowing medium to centrifugal forces, said heavier particles being suspended in said flowing lighter medium, with an apparatus comprising spin generator means including a housing with a given flow diameter and having an axis, exit pipe means including an exit port, said exit pipe means being arranged to extend coaxially with said axis of said spin generator housing, tangential inlet means operatively connected to said spin generator housing for producing a substantially tangential flow in said spin generator housing, said coaxially extending exit pipe means having a diameter smaller than said given diameter of the spin generator housing for converting the substantially tangential flow of the flowing medium with the particles suspended therein into a spinning pipe flow in said exit pipe means, said smaller exit pipe diameter substantially increasing the rotational flow speed in said exit pipe means, separator chamber means having a diameter larger than said exit pipe means, said separator chamber means being arranged for cooperation with said spin generator housing, said exit pipe means being centrally connected to said spin generator housing and extending coaxially into said separator chamber means for imparting an angular momentum, due to said smaller diameter of the exit pipe means, to the flow as it passes from said spin generator housing through said exit pipe means into said separator chamber means, wherein the flow is subjected to a flow diameter expansion, exhaust pipe means also extending coaxially into said separator chamber means coaxially to and opposite said exit pipe means, said exit port being located in the respective separator chamber means, said exhaust pipe means having an entrance port located in the respective separator chamber means at such a position that a predetermined spacing is established between the exit port and the entrance port which face each other in said separator chamber means, said spacing providing an expansion zone between said ports for said flow diameter expansion, whereby an eddy source flow is generated in said flow expansion zone, said apparatus further comprising tangentially effective active exhaust means extending at least for the axial length of said predetermined spacing and operatively connected to said separator chamber means substantially in parallel to said flow expansion zone, said exhaust means amplifying the expanding eddy source flow by superimposing on said eddy source flow a tangentially effective exhaust suction flow in said flow expansion zone, whereby any particles entrained in an axial or radially inwardly directed path are again shifted radially outwardly by the superposition of the radial component of said flow expansion and the radial component of said tangentially effective exhaust means thereby removing the heavier particles toward said tangentially effective exhaust means, and axially effective exhaust means connected to said exhaust pipe means, whereby the lighter now cleaned medium is axially exhausted through said exhaust pipe means, said method comprising the steps:

(a) causing a substantially tangential flow of the flowing medium with the particles suspended therein in said spin generator means, (b) reducing the flow diameter by passing the flow into said exit pipe means to convert the flow into a spinning pipe flow and to impart angular momentum to the spinning pipe flow and to substantially increase the rotational speed of said flow by said flow diameter reduction whereby said heavier particles are accumulated in a circumferentially outer zone of said spinning pipe flow, (c) axially spacing said exit port, from which said spinning pipe flow exits, from said coaxially arranged exhaust port for said clean medium, to provide said flow expansion zone between said exit port and said exhaust port, (d) increasing the flow diameter by expanding said spinning pipe flow into said flow expansion zone under its own centrifugal force as the spinning pipe flow exits from said exit port to thereby generate an eddy source flow in said flow expansion zone, (e) superimposing by means of said active exhaust means a tangentially effective, active exhaust suction flow on said expanding eddy source flow for amplifying and stabilizing said eddy source flow in said flow expansion zone and for combining the radially effective centrifugal force component with the radially effective component of the tangential exhaust suction flow whereby any particles entrained in an axial or radially inwardly directed flow are again shifted radially outwardly toward tangential exit ports prior to any axial escape of a particle so that said heavier particles are separated from the flowing medium into said tangentially effective exhaust suction flow, and (f) axially exhausting said clean, lighter medium through said exhaust port.

2. The method of claim 1, wherein said tangential flow is caused by means of a cyclone generator.

3. The method of claim 1, wherein said tangential flow is accomplished by means of a spirally shaped housing.

4. The method of claim 1, further comprising performing said amplifying and said axially exhausting symmetrically relative to said spinning pipe flow.

5. The method of claim 1, further comprising imparting an additional spin drive to said spinning flow by means of a rotating cylinder.

6. The method of claim 1, further comprising treating said medium in sequentially arranged stages and combining partial flows from preceding stages for further treatment in succeeding stages whereby flow diameter reductions and expansions are repeatedly employed in sequence.

7. An apparatus for separating heavier particles from a flowing lighter medium by subjecting the flowing medium to centrifugal forces, said heavier particles being suspended in said flowing lighter medium, comprising spin generator means including a housing (1) with a given flow diameter and having an axis (4), exit pipe means (10) including an exit port (14), said exit pipe means being arranged to extend coaxially with said axis (4) of said spin generator housing (1), tangential inlet means (7) operatively connected to said spin generator housing for producing a substantially tangential flow in said spin generator housing, said coaxially extending exit pipe means (10) having a diameter smaller than said given diameter of the spin generator housing for converting the substantially tangential flow of the flowing medium with the particles suspended therein into a spinning pipe flow in said exit pipe means (10), said smaller exit pipe diameter substantially increasing the rotational flow speed in said exit pipe means, separator chamber means (2) having a diameter larger than said exit pipe means, said separator chamber means being arranged for cooperation with said spin generator housing (1), said exit pipe means being centrally connected to said spin generator housing (1) and extending coaxially into said separator chamber means (2) for imparting an angular momentum, due to said smaller diameter of the exit pipe means, to the flow as it passes from said spin generator housing (1) through said exit pipe means (10) into said separator chamber means (2), wherein the flow is subjected to a flow diameter expansion, exhaust pipe means (10a) also extending coaxially into said separator chamber means (2) coaxially to and opposite said exit pipe means (10), said exit port (14) being located in the respective separator chamber means (2), said exhaust pipe means (10a) having an entrance port (15) located in the respective separator chamber means at such a position that a predetermined spacing (12) is established between the exit port (14) and the entrance port (15) which face each other in said separator chamber means (2), said spacing (12) providing an expansion zone between said ports (14, 15) for said flow diameter expansion, whereby an eddy source flow is generated in said flow expansion zone (12), said apparatus further comprising tangentially effective active exhaust means (8) extending at least for the axial length of said predetermined spacing and operatively connected to said separator chamber means (2) substantially in parallel to said flow expansion zone (12), said exhaust means (8) amplifying the expanding eddy source flow by superimposing on said eddy source flow a tangentially effective exhaust suction flow in said flow expansion zone (12), whereby any particles entrained in an axial or radially inwardly directed path are again shifted radially outwardly by the superposition of the radial component of said flow expansion and the radial component of said tangentially effective exhaust means (8) thereby removing the heavier particles toward said tangentially effective exhaust means (8), and axially effective exhaust means connected to said exhaust pipe means (10a) whereby the lighter now cleaned medium is axially exhausted through said exhaust pipe means (10a).

8. The apparatus of claim 7, further comprising means (19, 20) for the recovery of spin energy operatively located in said axial exhaust pipe means (10a).

9. The apparatus of claim 7, wherein said spin generator means comprise a cyclone separator.

10. The apparatus of claim 7, further comprising radial blower means having intake port means and exit port means, said radial blower means being arranged relative to said separator chamber means in such position that said exhaust pipe means merge into said intake port means of said radial blower means.

11. The apparatus of claim 10, wherein said radial blower means comprise two radial blowers arranged mirror symmetrically relative to the respective separator chamber means, said two radial blowers comprising a common shaft and a common drive means connected to said common shaft.

12. The apparatus of claim 11, wherein said common shaft is a rotating cylinder for driving said spinning flow.

13. The apparatus of claim 7, wherein said spin generator means comprise a rotating cylinder for driving said spinning pipe flow.

14. The apparatus of claim 7, wherein said exit pipe means of said spin generator housing merge smoothly (14') into the respective spin generator housing wall, and wherein said exhaust pipe means (10a) merge smoothly into the respective wall of the separation chamber means.

* * * * *